(12) United States Patent　　(10) Patent No.: US 11,288,827 B2
Izumikawa　　(45) Date of Patent: *Mar. 29, 2022

(54) MEASUREMENT DEVICE OF SHOVEL

(71) Applicant: SUMITOMO(S.H.I.) CONSTRUCTION MACHINERY CO., LTD., Tokyo (JP)

(72) Inventor: Takeya Izumikawa, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/930,569

(22) Filed: May 13, 2020

(65) Prior Publication Data

US 2020/0273191 A1　Aug. 27, 2020

Related U.S. Application Data

(63) Continuation of application No. 15/896,645, filed on Feb. 14, 2018, now Pat. No. 10,679,371, which is a
(Continued)

(30) Foreign Application Priority Data

Aug. 26, 2015　(JP) .............................. JP2015-167166

(51) Int. Cl.
*G06T 7/593*　　(2017.01)
*G01C 7/04*　　(2006.01)
(Continued)

(52) U.S. Cl.
CPC .............. *G06T 7/593* (2017.01); *E02F 9/261* (2013.01); *G01B 11/245* (2013.01); *G01C 7/04* (2013.01);
(Continued)

(58) Field of Classification Search
CPC ........... G06T 7/593; G06T 2207/30181; G06T 2207/10012; H04N 5/2253; H04N 7/18;
(Continued)

(56) References Cited

U.S. PATENT DOCUMENTS

| | | |
|---|---|---|
| 5,854,988 A | 12/1998 | Davidson et al. |
| 6,201,883 B1 | 3/2001 | Mizui |

(Continued)

FOREIGN PATENT DOCUMENTS

| | | |
|---|---|---|
| CN | 103528571 | 1/2014 |
| JP | S60-115972 | 6/1985 |

(Continued)

OTHER PUBLICATIONS

International Search Report for PCT/JP2016/074763 dated Nov. 1, 2016.

*Primary Examiner* — Jared Walker
(74) *Attorney, Agent, or Firm* — IPUSA, PLLC

(57) ABSTRACT

A measurement device of a shovel, wherein the measurement device is installed in the shovel including a lower travelling body that performs traveling operation; an upper turning body pivotably mounted on the lower traveling body; a boom that is attached to the upper turning body, the boom being included in an attachment; and an arm that is attached to the boom, the arm being included in the attachment, wherein the measurement device measures a landform in a vicinity of the shovel at a plurality of positions based on an output of a device that captures information on a distance to a surrounding measurement target, the device being located above the lower traveling body.

19 Claims, 14 Drawing Sheets

Related U.S. Application Data continuation of application No. PCT/JP2016/074763, filed on Aug. 25, 2016.

(51) Int. Cl.

| | | |
|---|---|---|
| *G01C 11/06* | (2006.01) | |
| *G01B 11/245* | (2006.01) | |
| *H04N 7/18* | (2006.01) | |
| *E02F 9/26* | (2006.01) | |
| *H04N 5/225* | (2006.01) | |
| *E02F 3/30* | (2006.01) | |
| *G07C 5/08* | (2006.01) | |

(52) U.S. Cl.
CPC ........... *G01C 11/06* (2013.01); *H04N 5/2253* (2013.01); *H04N 7/18* (2013.01); *H04N 7/181* (2013.01); *E02F 3/30* (2013.01); *E02F 9/262* (2013.01); *E02F 9/264* (2013.01); *G06T 2207/10012* (2013.01); *G06T 2207/30181* (2013.01); *G07C 5/0825* (2013.01)

(58) Field of Classification Search
CPC .... H04N 7/181; G07C 5/0825; G01B 11/245; G01C 11/06; G01C 7/04; E02F 9/26; E02F 9/261; E02F 9/264; E02F 9/262; E02F 3/30

See application file for complete search history.

(56) References Cited

U.S. PATENT DOCUMENTS

| | | | |
|---|---|---|---|
| 9,340,957 B2 | 5/2016 | Magaki et al. | |
| 9,540,786 B2 | 1/2017 | Ogawa | |
| 2003/0004645 A1* | 1/2003 | Kochi | H04N 13/194 |
| | | | 702/1 |
| 2009/0202109 A1 | 8/2009 | Clar et al. | |
| 2010/0245542 A1 | 9/2010 | Kim et al. | |
| 2012/0212588 A1 | 8/2012 | Ohtomo et al. | |
| 2013/0158785 A1* | 6/2013 | Fukano | E02F 9/261 |
| | | | 701/34.4 |
| 2013/0222573 A1* | 8/2013 | Onuma | H04N 7/18 |
| | | | 348/82 |
| 2013/0222594 A1* | 8/2013 | Kiyota | H04N 7/181 |
| | | | 348/148 |
| 2014/0247328 A1 | 9/2014 | Popham et al. | |
| 2014/0285794 A1 | 9/2014 | Ito et al. | |
| 2015/0249821 A1 | 9/2015 | Tanizumi et al. | |

FOREIGN PATENT DOCUMENTS

| | | |
|---|---|---|
| JP | H04-222175 | 8/1992 |
| JP | H09-115001 | 5/1997 |
| JP | H09-126743 | 5/1997 |
| JP | H10-103925 | 4/1998 |
| JP | H11-211473 | 8/1999 |
| JP | 2000-291048 | 10/2000 |
| JP | 2002-328022 | 11/2002 |
| JP | 2002-352224 | 12/2002 |
| JP | 2007-256029 | 10/2007 |
| JP | 2008-163719 | 7/2008 |
| JP | 2009-541778 | 11/2009 |
| JP | 2010-60344 | 3/2010 |
| JP | 4943899 | 5/2012 |
| JP | 2012-173114 | 9/2012 |
| JP | 2014-062803 | 4/2014 |
| JP | 2014-148893 | 8/2014 |
| JP | 2014-177784 | 9/2014 |
| JP | 2014-185996 | 10/2014 |
| JP | 2014-190089 | 10/2014 |
| JP | 2014-215039 | 11/2014 |
| JP | 2014-225803 | 12/2014 |
| WO | 2008/079192 | 7/2008 |

* cited by examiner

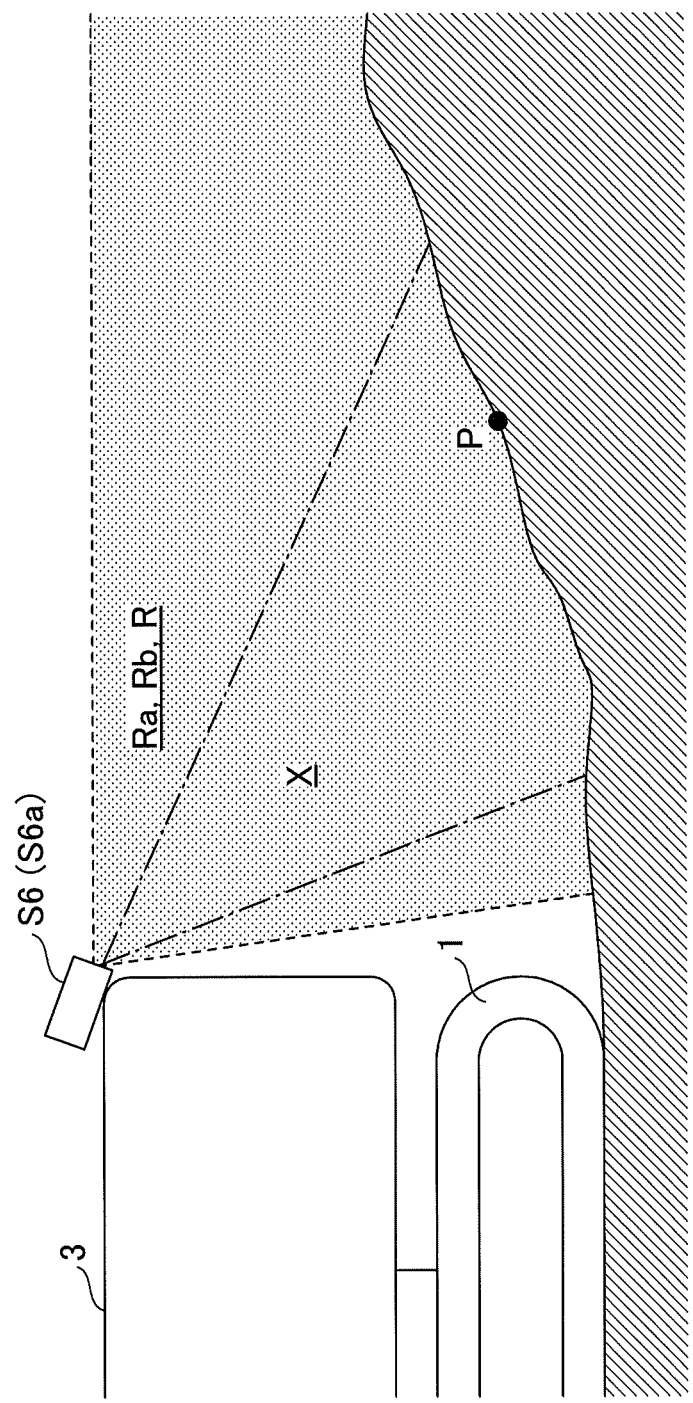

MEASUREMENT DEVICE OF SHOVEL

CROSS-REFERENCE TO RELATED APPLICATION

The present application is a continuation application filed under 35 U.S.C. 111(a) claiming the benefit under 35 U.S.C. 120 of U.S. patent application Ser. No. 15/896,645 filed on Feb. 14, 2018, which is a continuation of International Application No. PCT/JP2016/074763, filed on Aug. 25, 2016, which is based on and claims the benefit of priority to Japanese Priority Application No. 2015-167166, filed on Aug. 26, 2015, the entire contents of which are hereby incorporated herein by reference.

BACKGROUND

Technical Field

The present disclosure relates to a measurement device for measuring a landform in a vicinity a shovel.

Description of Related Art

A shovel has been known that includes a display system for deriving a track of an edge of a bucket based on a three-dimensional position of a shovel main body, tilt angles of a boom, an arm, and the bucket, respectively, and a tilt angle of the shovel main body in a width direction (cf. Patent Document 1, for example).

This display system displays a cross-sectional view of a designed landform based on design data and a cross-sectional view of a current landform represented by the track of the edge on a monitor.

As for the display system according to Patent Document 1, however, sediment spilled from the bucket, sediment collapsed into a hollow, backfilled sediment, etc., are not considered. As a result, a cross-sectional view of a current landform may not be accurately displayed.

In view of the above, it is desirable to provide a measurement device that is capable of more accurately measuring a landform in a vicinity of a shovel.

SUMMARY

According to an aspect of the present disclosure, there is provided a measurement device of a shovel, wherein the measurement device is installed in the shovel including a lower travelling body that performs traveling operation; an upper turning body pivotably mounted on the lower traveling body; a boom that is attached to the upper turning body, the boom being included in an attachment; and an arm that is attached to the boom, the arm being included in the attachment, wherein the measurement device measures a landform in a vicinity of the shovel at a plurality of positions based on an output of a device that captures information on a distance to a surrounding measurement target, the device being located above the lower traveling body.

BRIEF DESCRIPTION OF THE DRAWINGS

FIG. 5 is a left side view of the shovel illustrating a position to which the camera is attached;

DETAILED DESCRIPTION

Figure 1:
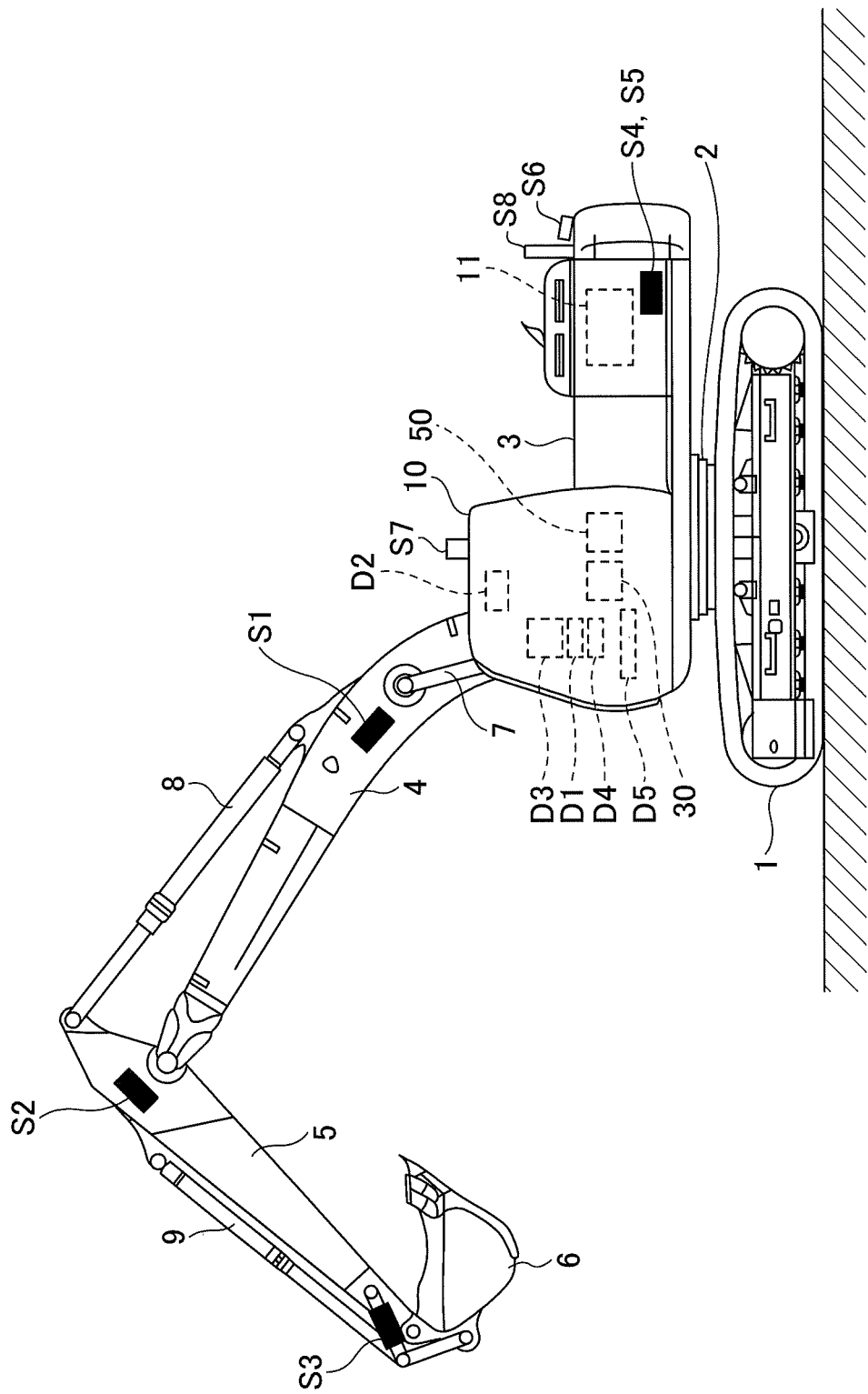
FIG. 1 is a side view of a shovel according to an embodiment of the present disclosure.

FIG. 1 is a side view of a shovel (excavator) according to an embodiment of the present disclosure. An upper turning body 3 is pivotably mounted on a lower travelling body 1 of the shovel through a turning mechanism 2. A boom 4 is attached to the upper turning body 3. An arm 5 is attached to an edge of the boom 4, and a bucket 6 is attached to an end of the arm 5 as an end attachment. As an end attachment, a bucket for a slope, a dredging bucket, etc., may be used.

The boom 4, the arm 5, and the bucket 6 form a back-hoe attachment as an example of an attachment, and are hydraulically driven by a boom cylinder 7, an arm cylinder 8, and a bucket cylinder 9, respectively. A boom angle sensor S1 is attached to the boom 4, an arm angle sensor S2 is attached to the arm 5, and a bucket angle sensor S3 is attached to the bucket 6. A bucket tilt mechanism may be provided to the back-hoe attachment.

The boom angle sensor S1 detects a rotation angle of the boom 4. In the embodiment, the boom angle sensor S1 is an acceleration sensor for detecting a rotation angle of the boom 4 with respect to the upper turning body 3 by detecting a tilt with respect to the horizontal plane.

The arm angle sensor S2 detects a rotation angle of the arm 5. In the embodiment, the arm angle sensor S2 is an acceleration sensor for detecting a rotation angle of the arm 5 with respect to the boom 4 by detecting a tilt with respect to the horizontal plane.

The bucket angle sensor S3 detects a rotation angle of the bucket 6. In the embodiment, the bucket angle sensor S3 is an acceleration sensor for detecting a rotation angle of the bucket 6 with respect to the arm 5 by detecting a tilt with respect to the horizontal plane. When the back-hoe attachment is provided with the bucket tilt mechanism, the bucket angle sensor S3 additionally detects a rotational angle of the bucket 6 around a tilt axis.

Each of the boom angle sensor S1, the arm angle sensor S2, and the bucket angle sensor S3 may be a potentiometer using variable resistor, a stroke sensor for detecting a stroke amount of the corresponding hydraulic cylinder, a rotary encoder for detecting a rotation angle around a connecting pin, etc.

In the upper turning body 3, a cabin 10 is provided and a power source is installed, such as an engine 11. A body tilt sensor S4, a turning angular velocity sensor S5, and a camera S6 are attached to the upper turning body 3. A communication device S7 and a positioning device S8 may be attached.

The body tilt sensor S4 detects a tilt of the upper turning body 3 with respect to the horizontal plane. In the embodiment, the body tilt sensor S4 is a two-axis acceleration sensor for detecting a tilt angle around a front-rear axis and a tilt angle around a left-right axis of the upper turning body 3. The front-rear axis and the left-right axis of the upper turning body 3 are, for example, orthogonal to each other and pass through a shovel center point, which is a point on a turning axis.

The turning angular velocity sensor S5 is, for example, a gyrosensor, and detects a turning angular velocity of the upper turning body 3. The turning angular velocity sensor S5 may be a resolver, a rotary encoder, and so forth.

The camera S6 is an image capturing device capable of stereo photographing, which is for capturing an image in the vicinity of the shovel. In the embodiment, the camera S6 is one or more stereo cameras attached to the upper turning body 3. However, the camera S6 may be a monocular camera. In this case, the camera S6 utilizes two camera images captured while slightly varying an image capturing position as the stereo-pair images. For example, shifting of the image capturing position is made by turning the upper turning body 3, and positioning is executed using a gyrosensor, GNSS (Global Navigation Satellite System), etc.

The communication device S7 is a device for controlling communication between the shovel and the outside. The communication device S7 controls, for example, radio communication between a positioning system, such as the GNSS, and the shovel. By using the communication device S7, the shovel can obtain design data including information about a target formation level, etc., through radio communication. Alternatively, the shovel may obtain the design data using a semiconductor memory, etc.

The positioning device S8 is a device for measuring a position and an orientation of the shovel. In the embodiment, the positioning device S8 is a GNSS receiver in which an electronic compass is embedded, and measures latitude, longitude, and altitude of the existing position of the shovel and an orientation of the shovel.

Inside the cabin 10, an input device D1, an audio output device D2, a display device (display unit) D3, a storage device D4, a gate lock lever D5, a controller 30, and a machine guidance device 50 are installed.

The controller 30 functions as a main controller for executing drive control of the shovel. In the embodiment, the controller 30 is formed of a processor including a CPU and an internal memory. Various types of functions of the controller 30 are implemented by the CPU by executing a program stored in the internal memory.

The machine guidance device 50 is for guiding an operation of the shovel. In the embodiment, the machine guidance device 50, for example, visually and aurally informs an operator of a vertical distance between a target formation level set up by the operator and a position of a front edge (tip) of the bucket 6. By doing this, the machine guidance device 50 guides an operation of the shovel by the operator. The machine guidance device 50 may inform the operator of the distance only visually or only aurally. Specifically, the machine guidance device 50 may be formed of a processor including a CPU and an internal memory, similar to the controller 30. Various types of functions of the machine guidance device 50 are implemented by the CPU by executing a program stored in the internal memory. The machine guidance device 50 may be provided separately from the controller 30, or may be embedded in the controller 30.

The input device D1 is a device for an operator of the shovel to input various types of information into the machine guidance device 50. In the embodiment, the input device D1 is membrane switches attached to a part in the vicinity of the display device D3. A touch panel, etc., may be used as the input device D1.

The audio output device D2 outputs various types of audio information in response to an audio output command from the machine guidance device 50. In the embodiment, an in-vehicle speaker that is directly connected to the machine guidance device 50 is used as the audio output device D2. As the audio output device D2, an alarm device, such as a buzzer, may be used.

The display device D3 outputs various types of image information in response to a command from the machine guidance device 50. In the embodiment, an in-vehicle liquid crystal display that is directly connected to the machine guidance device 50 is used as the display device D3.

The storage device D4 is a device for storing various types of information. In the embodiment, a non-volatile storage medium, such as a semiconductor memory, is used as the storage device D4. The storage device D4 stores various types of information to be output by the machine guidance device 50, etc.

The gate lock lever D5 is a mechanism for preventing the shovel from being erroneously operated. In the embodiment, the gate lock lever D5 is installed between a door of the cabin 10 and a driver's seat. When the gate lock lever D5 is pulled up so that an operator is prevented from exiting from the cabin 10, various types of operation devices become operable. In contrast, when the gate lock lever D5 is pushed down so that an operator can exit from the cabin 10, the various types of operation devices becomes inoperable.

Figure 2:
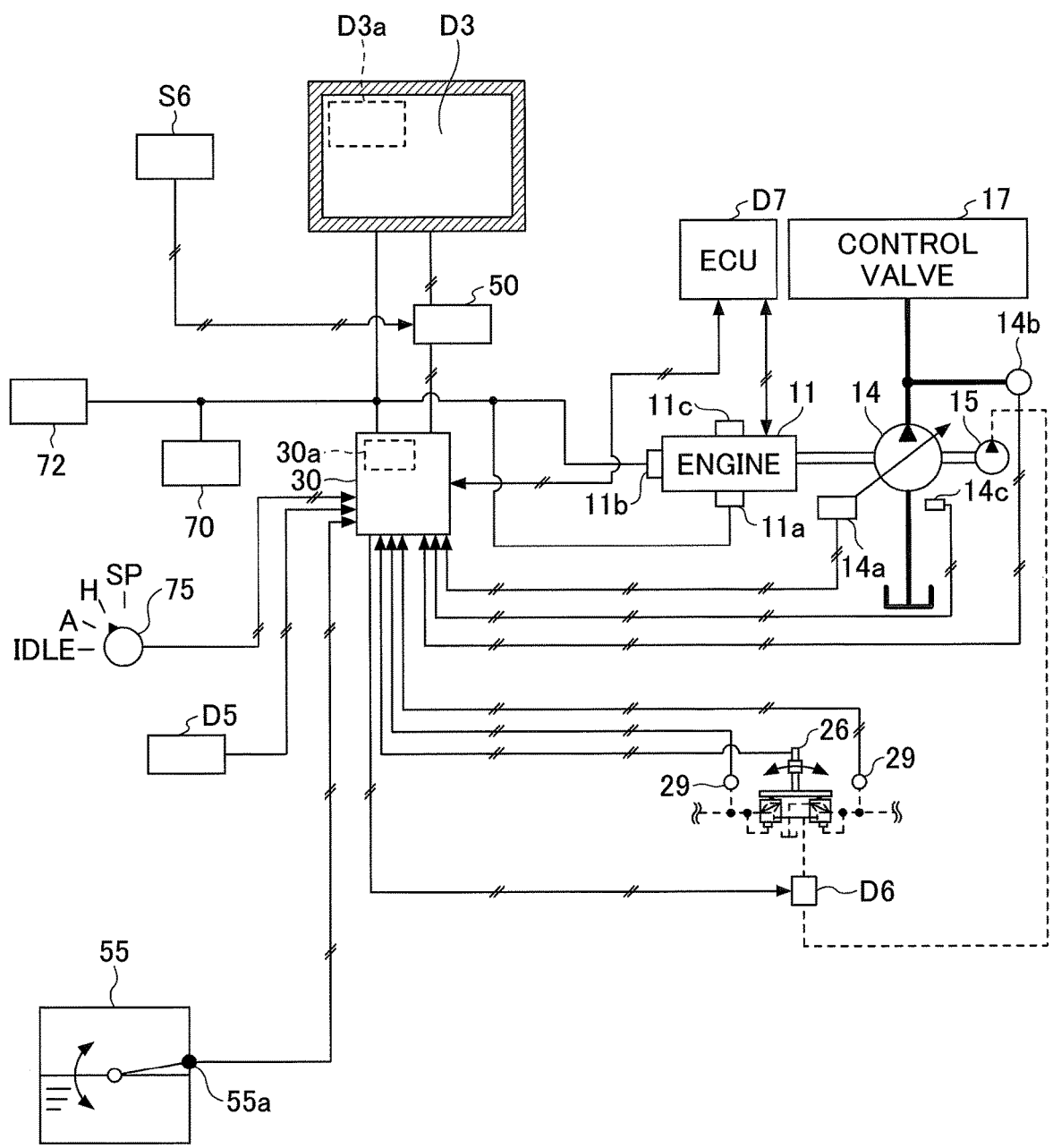
FIG. 2 is a diagram illustrating a configuration of a drive system of the shovel of FIG. 1.

FIG. 2 is a diagram illustrating an example of a configuration of a drive system of the shovel of FIG. 1. In FIG. 2, a mechanical drive system is indicated by a double line, a high pressure hydraulic line is indicated by a thick solid line, a pilot line is indicated by a dashed line, and an electronic drive/control system is indicated by a thin solid line.

An engine 11 is a power source of the shovel. In the embodiment, engine 11 is a diesel engine that adopts isochronous control such that a number of revolutions of the engine is kept constant regardless of an increase or a decrease in an engine load. In the engine 11, a fuel injection amount, a fuel injection timing, boost pressure, and so forth are controlled by an engine controller unit (ECU) D7.

A main pump 14 and a pilot pump 15 are connected to the engine 11 as hydraulic pumps. A control valve 17 is connected to the main pump 14 through a high pressure hydraulic line.

The control valve 17 is a hydraulic control device for controlling a hydraulic system of the shovel. Hydraulic actuators, such as a right traveling hydraulic motor, a left traveling hydraulic motor, the boom cylinder 7, the arm cylinder 8, the bucket cylinder 9, and a turning hydraulic motor, are connected to the control valve 17 through the high pressure hydraulic line. The turning hydraulic motor may be a turning motor generator.

An operation device 26 is connected to the pilot pump 15 through a pilot line. The operation device 26 includes a lever and a pedal. The operation device 26 is connected to the control valve 17 through a hydraulic line and a gate lock valve D6.

The gate lock valve D6 is for switching communicating/blocking of the hydraulic line that connects the control valve 17 to the operation device 26. In the embodiment, the gate lock valve D6 is an electromagnetic valve for switching communicating/blocking of the hydraulic line in response to a command from the controller 30. The controller 30 determines a state of the gate lock lever D5 based on a state signal output by the gate lock lever D5. Then, upon determining that the gate lock lever D5 is in a pulled-up state, the controller 30 outputs a communication command to the gate lock valve D6. In response to receiving the communication command, the gate lock valve D6 opens to communicate the hydraulic line. As a result, an operation on the operation device 26 by an operator becomes effective. In contrast, upon determining that the gate lock lever D5 is in a pulled-down state, the controller 30 outputs a blocking command to the gate lock valve D6. In response to receiving the blocking command, the gate lock valve D6 closes to block the hydraulic line. As a result, an operation on the operation device 26 by an operator becomes ineffective.

A pressure sensor 29 detects details of an operation on the operation device 26 in a form of pressure. The pressure sensor 29 outputs a detection value to the controller 30.

FIG. 2 illustrates relation of connection between the controller 30 and the display device D3. In the embodiment, the display device D3 is connected to the controller 30 through the machine guidance device 50. The display device D3, the machine guidance device 50, and the controller 30 may be connected through a communication network, such as CAN, or may be connected through a dedicated line.

The display device D3 includes a conversion processor D3a for generating an image. In the embodiment, the conversion processor D3a generates a camera image to be displayed based on an output of the camera S6. Accordingly, the display device D3 obtains, through the machine guidance device 50, an output of the camera S6 connected to the machine guidance device 50. Note that the camera S6 may be connected to the display device D3, or the camera S6 may be connected to the controller 30.

The conversion processor D3a generates an image to be displayed based on an output of the controller 30 or the machine guidance device 50. In the embodiment, the conversion processor D3a converts various types of information output by the controller 30 or the machine guidance device 50 into image signals. The information output by the controller 30 includes, for example, data indicating a temperature of engine cooling water, data indicating a temperature of a hydraulic oil, data indicating a residual amount of fuel, and so forth. The information output by the machine guidance device 50 includes, data indicating a position of a front end (tip) of the bucket 6, data indicating an orientation of a sloop that is a work target, data indicating an orientation of the shovel, data indicating an operation direction for causing the shovel to normally face a slope, and so forth.

The conversion processor D3a may be implemented as a function of the controller 30 or the machine guidance device 50, instead of the function of the display device D3.

The display device D3 receives supply of electric power from a storage battery 70 to operate. The storage battery 70 is charged by electric power generated by an alternator 11a (generator) of the engine 11. Electric power of the storage battery 70 is supplied, in addition to the controller 30 and the display device D3, to an electrical component 72, etc., of the shovel. A starter 11b of the engine 11 is driven by electric power from the storage battery 70 to start the engine 11.

The engine 11 is controlled by the engine controller unit D7. The engine controller unit D7 constantly transmits various types of date indicating a state of the engine 11 to the controller 30. The various types of data indicating the state of the engine 11 are, for example, data elements indicating cooling water temperatures (physical quantities) detected by a water temperature sensor 11c. Accordingly, the controller 30 stores the data in a temporary storage unit (memory) 30a, and can transmit the data to the display device D3 if necessary.

As described below, various types of data are supplied to the controller 30. The various types of data are stored in the temporary storage unit 30a of the controller 30.

First, data indicating a swash plate inclination angle is supplied from a regulator 14a of the main pump 14, which is a variable capacity hydraulic pump, to the controller 30. Additionally, data indicating discharge pressure of the main pump 14 is transmitted from a discharge pressure sensor 14b to the controller 30. These data elements (data elements indicating physical quantities) are stored in the temporary storage unit 30a. An oil temperature sensor 14c is provided in a pipeline between a tank, in which hydraulic oil to be suctioned by the main pump 14 is stored, and the main pump 14. Data representing a temperature of the hydraulic oil flowing through the pipeline is supplied from the oil temperature sensor 14c to the controller 30.

Data indicating a fuel storage amount is supplied from a fuel storage amount detector 55a in a fuel container 55 to the controller 30. In the embodiment, data indicating a residual quantity state of the fuel is supplied from a fuel residual quantity sensor, as the fuel storage amount detector 55a in the fuel container 55, as a fuel tank, to the controller 30.

Specifically, the fuel residual quantity sensor is formed of a float that follows a liquid surface; and a variable resister (potentiometer) that converts a vertical fluctuation amount of the float into a resistance value. With this configuration, the fuel residual quantity sensor can cause the display device D3 to continuously display the residual quantity state of the fuel. The detection method of the fuel storage amount detector 55a may be suitably selected depending on an operating environment, etc., and a detection method may be adopted with which the residual quantity state of the fuel can be displayed in a step wise-manner.

The pilot pressure transmitted, upon the operation device 26 being operated, to the control valve 17 is detected by the pressure sensor 29. The pressure sensor 29 supplies data indicating the detected pilot pressure to the controller 30.

According to the embodiment, as illustrated in FIG. 2, the shovel includes an engine speed adjustment dial 75 located in the cabin 10. The engine speed adjustment dial 75 is a dial for adjusting a number of revolutions of the engine 11, and in the embodiment, the number of revolutions of the engine can be switched in four steps. From the engine speed adjustment dial 75, data indicating a setup state of the number of revolutions of the engine is constantly transmitted to the controller 30. The engine speed adjustment dial 75 can switch the number of revolutions of the engine in four steps, which are an SP mode, an H mode, an A mode, and an idling mode. FIG. 2 depicts a state in which the H mode is selected in the engine speed adjustment dial 75.

The SP mode is a revolution number mode to be selected when an amount of work is to be prioritized, and the SP mode utilizes the largest number of revolutions of the engine. The H mode is a revolution number mode to be selected when both the amount of the work and the fuel efficiency are to be prioritized, and the H mode utilizes the second largest number of revolutions of the engine. The A mode is a revolution number mode to be selected when the shovel is to be operated with a low noise level while prioritizing the fuel efficiency, and the A mode utilizes the third largest number of revolutions of the engine. The idling mode is a revolution number mode to be selected when the engine 11 is to be in an idling state, and the idling mode utilizes the smallest number of revolutions of the engine. Then, the number of revolutions of the engine 11 is controlled to be constant at the number of revolutions of the engine of the revolution number mode selected by the engine speed adjustment dial 75.

Figure 3:
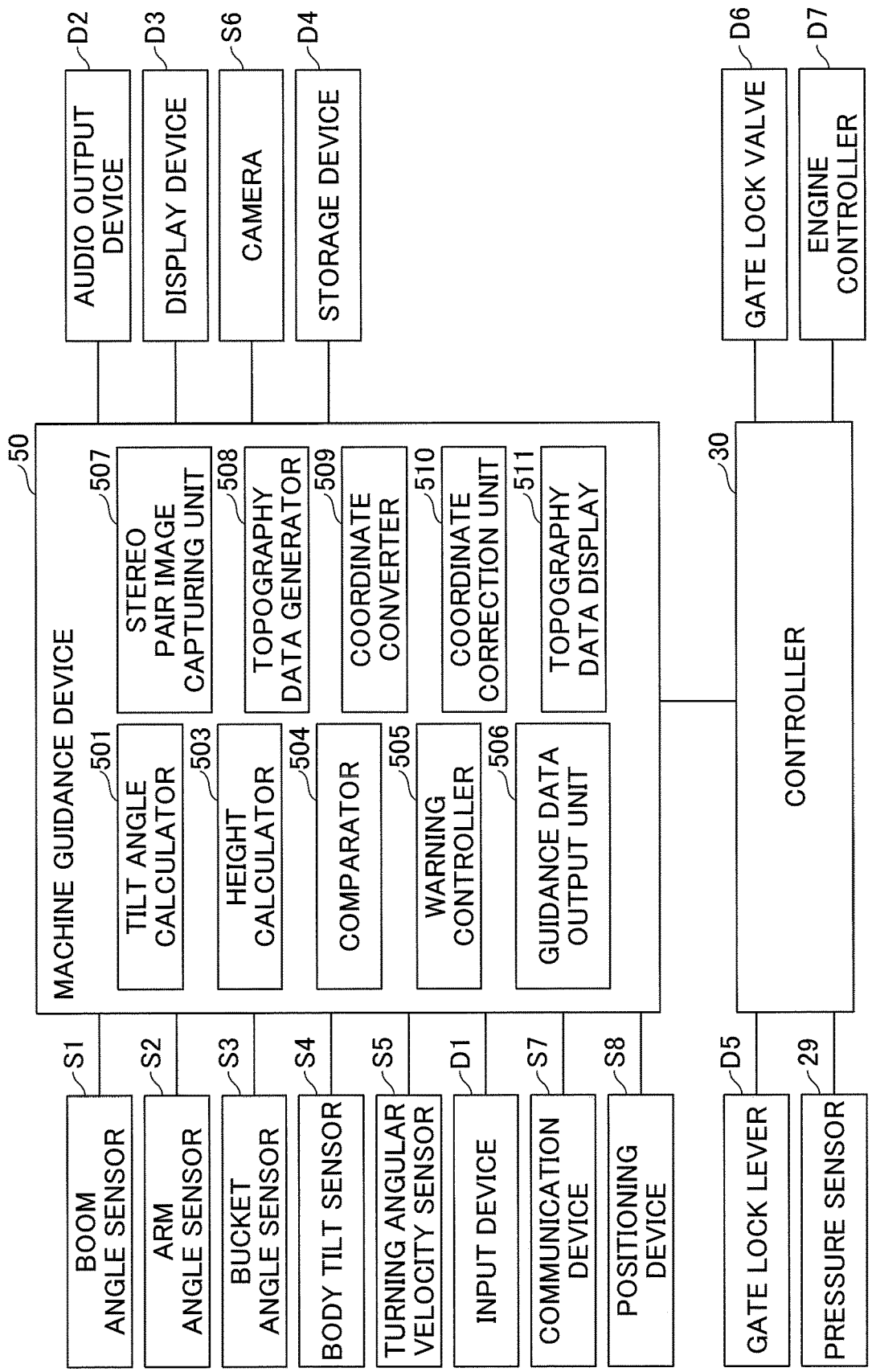
FIG. 3 is a block diagram illustrating an example of a configuration of a machine guidance device.

Next, various types of functional elements of the machine guidance device 50 are described by referring to FIG. 3. FIG. 3 is a functional block diagram illustrating an example of a configuration of the machine guidance device 50.

In the embodiment, the controller 30 controls whether guidance by the machine guidance device 50 is to be executed, in addition to control of the overall operation of the shovel. Specifically, the controller 30 controls whether the guidance by the machine guidance device 50 is to be executed based on a state of the gate lock lever D5, a detection signal from the pressure sensor 29, etc.

Next, the machine guidance device 50 is described. In the embodiment, the machine guidance device 50 receives various types of signals and data output from, for example, the boom angle sensor S1, the arm angle sensor S2, the bucket angle sensor S3, the body tilt sensor S4, the turning angular velocity sensor S5, the input device D1, and the controller 30. Then, the machine guidance device 50 calculates an actual position of an attachment (e.g., the bucket 6) based on the received signals and data. Then, upon detecting that the actual position of the attachment is different from a target position, the machine guidance device 50 transmits a warning command to the audio output device D2 and the display device D3 to announce the warning.

The machine guidance device 50 includes a functional unit that implements various functions. In the embodiment, the machine guidance device 50 includes, as the functional units for guiding operations of the attachments, a tilt angle calculator 501; a height calculator 503; a comparator 504; a warning controller 505; and a guidance data output unit 506. Additionally, the machine guidance device 50 includes, as the functional units for measuring a landform in the vicinity of the shovel, a stereo pair image capturing unit 507; a topography data generator 508; a coordinate converter 509; a coordinate correction unit 501; and a topography data display 511, and the machine guidance device 50 function as a measurement device of the shovel.

The tilt angle calculator 501 calculates a tilt angle of the upper turning body 3 (tilt angle of the shovel) with respect to the horizontal plane. For example, the tilt angle calculator 501 calculates a tilt angle of the shovel using a detection signal from the body tilt sensor S4.

The height calculator 503 calculates a height of an operating part of the end attachment. For example, the height calculator 503 calculates the height of the front end (tip) of the bucket 6 from the tilt angle calculated by the tilt angle calculator 501 and angles of the boom 4, the arm 5, and the bucket 6. The angles of the boom 4, the arm 5, and the bucket 6 are calculated from the detection signals from the boom angle sensor S1, the arm angle sensor S2, and the bucket angle sensor S3, respectively. In the embodiment, excavation is performed with the front end of the bucket 6. Accordingly, the front end (tip) of the bucket 6 corresponds to the operating part of the end attachment. However, when a work is performed, such as smoothing sediment with a back face of the bucket 6, the back face of the bucket 6 corresponds to the operating part of the end attachment. When a breaker is used as the end attachment other than the bucket 6, the front end of the breaker corresponds to the operating part of the end attachment.

The comparator 504 compares the height of the front end (tip) of the bucket 6 calculated by the height calculator 503 with a target height of the front end (tip) of the bucket 6. The target height is included in guidance data to be output from the guidance data output unit 506. The target height may be calculated from previously input guidance data, and a current position and a working posture of the shovel. The target height may be calculated from a past tip position of the shovel that was established, an input target depth, the tilt angle of the shovel, and a current working posture (current tip position).

Upon determining that a waning is required based on the comparison result by the comparator 504, the warning controller 505 transmits a warning command to one of or both the audio output device D2 and the display device D3. Upon receiving the warning command, the audio output device D2 and the display device D3 output a predetermined warning to inform an operator of the shovel of the predetermined warning.

The guidance data output unit 506 extracts target height data of the bucket 6 from the guidance data previously stored in a storage unit of the machine guidance device 50 to output the target height data to the comparator 504. At this time, the guidance data output unit 506 may output target height data of the bucket 6 corresponding to the current position, the working posture, the tilt angle, and so forth of the shovel.

The stereo pair image capturing unit 507 is a functional element for capturing stereo-pair images. The stereo-pair images are a pair of camera images used for deriving a distance between the camera S6 and a point to be measured (which is denoted as a "measurement point," hereinafter) using the triangulation method. In the embodiment, the stereo pair image capturing unit 507 captures a pair of camera images output by the camera S6, which is a stereo camera, as the stereo-pair images. The stereo pair image capturing unit 507 may capture, as the stereo-pair images, two camera images output by the camera S6 as a monocular camera. When the camera S6 as the monocular camera captures two camera images as the stereo-pair images, the shift in the image capturing position of the camera S6 is made, for example, by turning the upper turning body 3, and the shift is measured by using a gyrosensor, the GNSS, etc. Then, similar to the case where the camera S6 is the stereo camera, using the triangulation method, the distance between the camera S6 and the measurement point can be derived from the shift amount of the camera S6. Note that parameters of the camera S6, such as the attachment position, the attachment angle, and a focal length of the camera S6, are previously stored in the storage device D4. The stereo pair image capturing unit 507 reads out these parameters from the storage device D4, etc., if necessary.

Figure 4A:
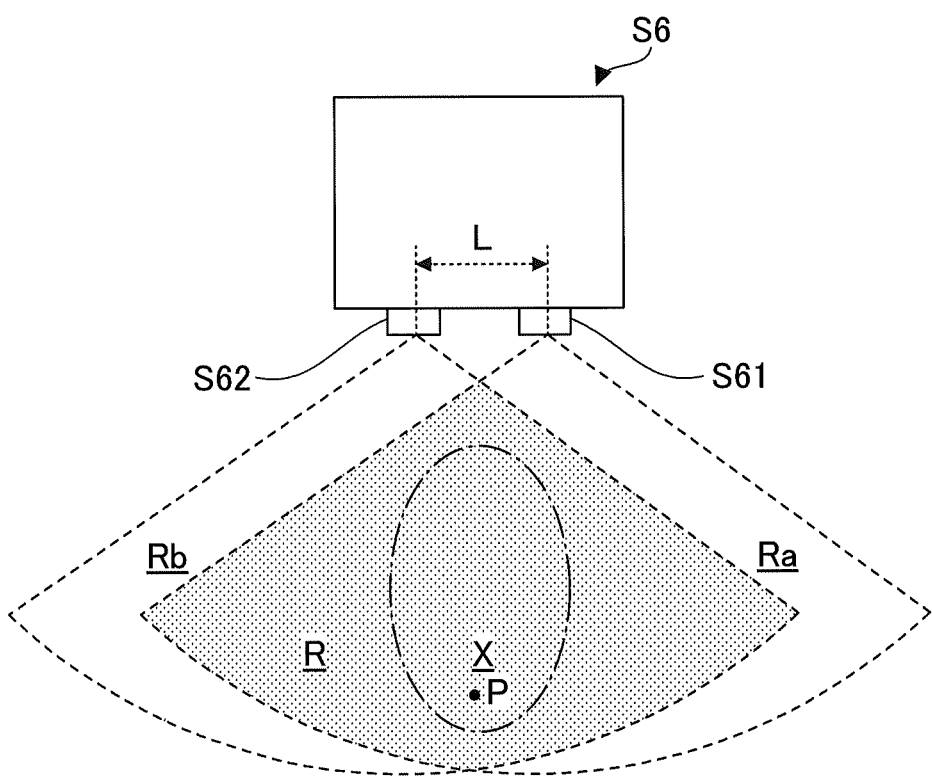
FIG. 4A is a diagram illustrating relation between stereo-pair images and a camera.
Figure 4B:
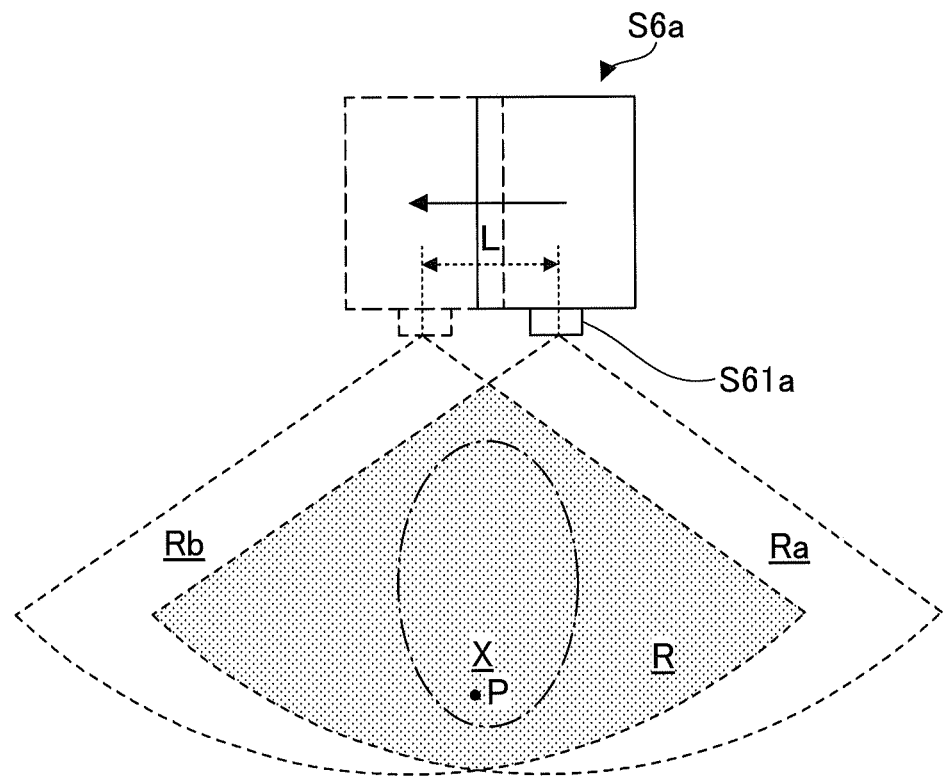
FIG. 4B is a diagram illustrating relation between stereo-pair images and a camera.
Figure 4C:
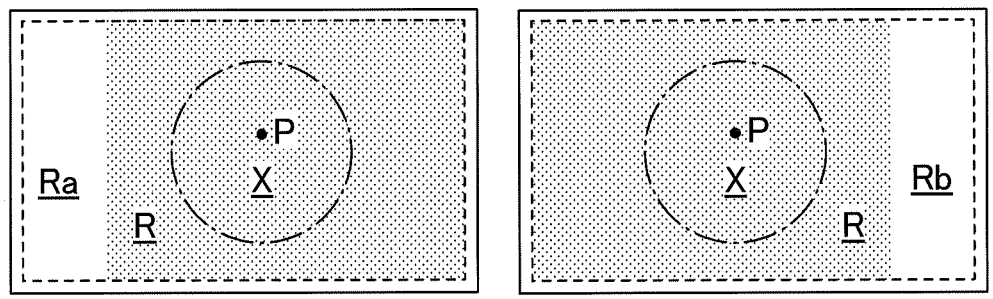
FIG. 4C is a diagram illustrating relation between stereo-pair images and a camera.

Here, details of the camera S6 are described by referring to FIG. 4A through FIG. 4C and FIG. 5. FIG. 4A through FIG. 4C are diagrams illustrating relation between the stereo-pair images and the camera S6. Specifically, FIG. 4A is a top view of the camera S6 as a stereo camera, and FIG.

4B is a top view of a camera S6a as a monocular camera. FIG. 4C is a schematic diagram of stereo-pair images captured by the camera S6 or the camera S6a. FIG. 5 is a left side view of the shovel illustrating the attachment position of the camera S6 (camera S6a).

As illustrated in FIG. 4A, when the camera S6 as the stereo camera is attached to the shovel, the stereo pair image capturing unit 507 obtains a pair of camera images captured at the same time by a pair of image capturing units S61 and S62 of the camera S6 as the stereo-pair images. Then, based on the shift between a pixel of one of the pair of the captured camera images corresponding to the measurement point P and another pixel of the other of the pair of the captured camera images corresponding to the measurement point P, and the distance L between the image capturing unit S61 and the image capturing unit S62, the distance between the camera S6 and the measurement point P is obtained using the triangulation method.

Alternatively, as illustrated in FIG. 4B, when the camera S6a as the monocular camera is attached to the shovel, the stereo pair image capturing unit 507 obtains two camera images captured by an image capturing unit S61a of the camera S6a at different timings as the stereo-pair images. For example, the stereo pair image capturing unit 507 obtains, as the stereo-pair images, a first camera image captured when the camera S6a is at the position indicated by the solid line and a second camera image captured when the camera S6a subsequently moves to the position indicated by the dashed line. In this case, the movement of the camera S6a is made, for example, by traveling of the shovel main body. Then, the stereo pair image capturing unit 507 determines the shift amount L of the camera S6a from the positioning information of the GNSS, and obtains the distance between the camera S6a and the measurement point P using triangulation method, similar to the case of FIG. 4A.

Further, in FIG. 4A through FIG. 4C, each of an image capturing range of the image capturing unit S61 and an image capturing range of the image capturing unit S61a (when the camera S6a is at the position indicated by the solid line) is represented by an image capturing range Ra surrounded by the dashed line. Additionally, each of an image capturing range of the image capturing unit S62 and an image capturing range of the image capturing unit S61a (when the camera S6a is at the position indicated by the dashed line) is represented by an image capturing range Rb surrounded by the dashed line. Further, an overlapping image capturing range R between the image capturing range Ra and the image capturing range Rb is hatched with a dot pattern. A measurement target range X surrounded by the one-dot chain line indicates an existence range of the measurement point. In the embodiment, the measurement target range X is limited to a central portion of each camera image. The reason is that, at a peripheral edge of each camera, a distance may not be accurately derived due to an effect of vignetting, distortion, etc. However, the present disclosure does not exclude a configuration such that the measurement target range X includes the peripheral edge.

Further, the stereo pair image capturing unit 507 captures the stereo-pair images each time a predetermined capturing condition is satisfied. The predetermined capturing condition is defined, for example, based on a turning angle of the upper turning body 3, a traveling distance of the shovel, and so forth. In the embodiment, the stereo pair image capturing unit 507 captures the stereo-pair images each time the upper turning body 3 turns by a predetermined turning angle α. The turning angle is derived, for example, from an output of the turning angular velocity sensor S5. Further, the stereo pair image capturing unit 507 may capture the stereo-pair images each time the shovel moves (drives) by a predetermined distance D. The moving distance is derived, for example, from an output of the positioning device S8. Alternatively, the stereo image capturing unit 507 may dynamically determine threshold values for the turning angle, the moving distance, and so forth, which are to be the capturing condition, so that the stereo-pair images including desired images of the measurement point can be efficiently captured. Further, the stereo pair image capturing unit 507 may capture the stereo-pair images at predetermined time intervals, or may capture the stereo-pair images at an appropriate timing in response to an operation input (e.g., a switching operation) by an operator of the shovel. The machine guidance device 50 as the measurement device measures a landform in the vicinity of the shovel from the stereo-pair images captured as described above.

Figure 6A:
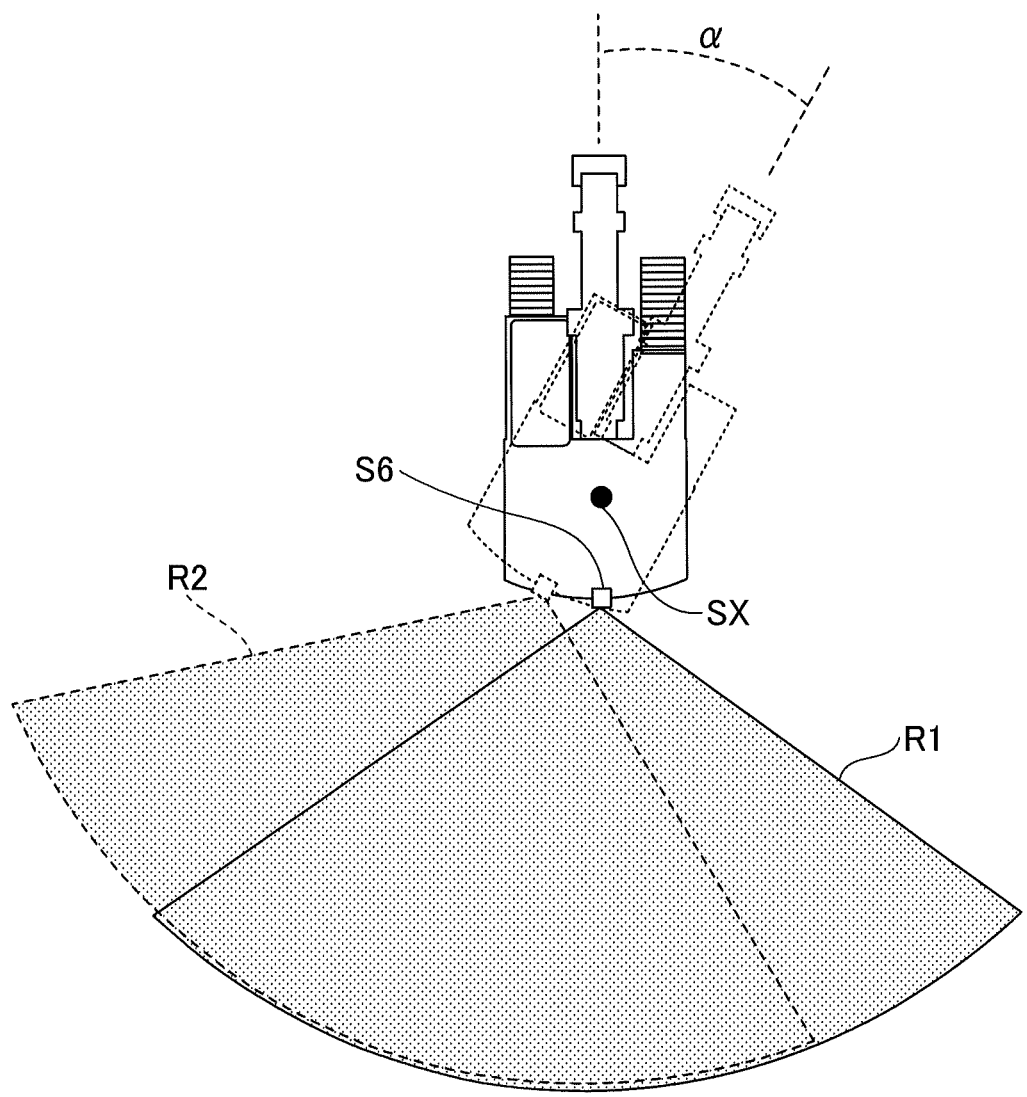
FIG. 6A is a top view of the shovel indicating an image capturing range of the camera.
Figure 6B:
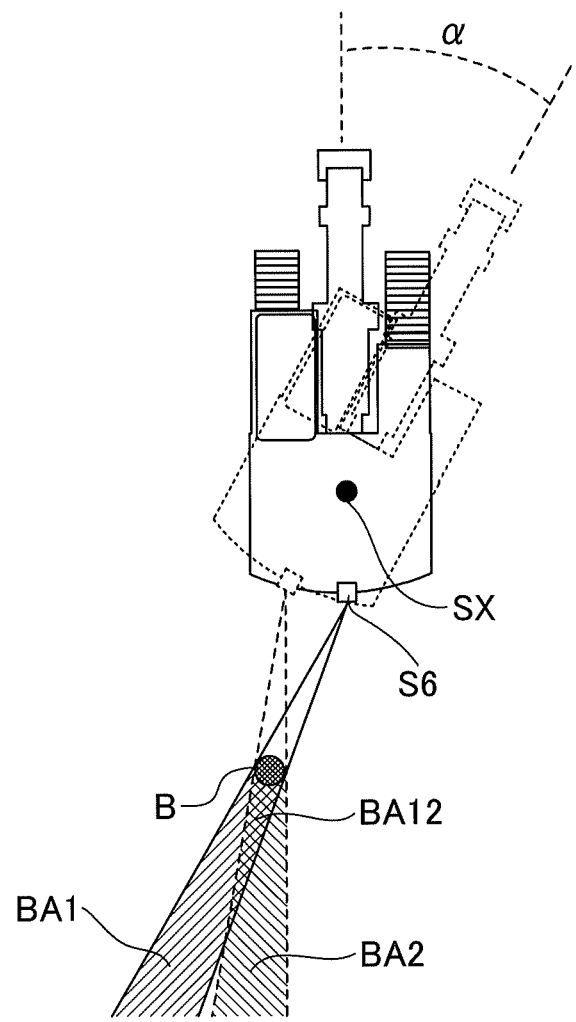
FIG. 6B is a top view of the shovel indicating an image capturing range of the camera.

Here, an example of a capturing condition of the stereo-pair images is described by referring to FIG. 6A and FIG. 6B. FIG. 6A and FIG. 6B are top views of the shovel illustrating image capturing ranges of the camera S6. Specifically, FIG. 6A depicts overlapping image capturing ranges R1 and R2 of the camera S6; and FIG. 6B depicts blind spot regions BA1 and BA2 formed by an object B located behind the shovel. The parts indicated by the dashed lines in FIG. 6A and FIG. 6B, respectively, depict a state in which the upper turning body 3 is turned by a turning angle α around a turning axis SX.

For example, the stereo pair image capturing unit 507 obtains a pair of camera images captured by the camera S6 when the shovel is directed in a reference direction as indicated in FIG. 6A by the solid line, as stereo-pair images. The overlapping image capturing range R1 represents a overlapping image capturing range of the image capturing ranges of the pair of the camera images captured by the camera S6 at this time.

After that, the stereo pair image capturing unit 507 obtains a pair of camera images captured by the camera S6 when the upper turning body 3 turns in the right direction by the turning angle α as depicted by the dashed line in FIG. 6A, as stereo-pair images. The overlapping image capturing range R2 represents an overlapping image capturing range of the image capturing ranges of the pair of the camera images captured by the camera S6 at this time.

Further, FIG. 6B illustrates one of effects of capturing stereo-pair images each time the upper turning body 3 turns by the turning angle α. Specifically, the blind spot region BA1 depicts a range in which a measurement point is located such that it is incapable of measuring the distance to the measurement point in the stereo-pair images captured when the shovel is directed in the reference direction, as depicted by the solid line in FIG. 6B. The blind spot region BA 2 depicts a range in which a measurement point is located such that it is incapable of measuring the distance of the measurement point in the stereo-pair images captured when the upper turning body 3 turns in the right direction by the turning angle α, as depicted by the dashed line in FIG. 6B. A blind spot region BA 12 indicates a range in which the blind spot region BA1 and the blind sport region BA 2 overlap. As described above, by capturing two pairs of the stereo-pair images captured at different turning angles, the stereo pair image capturing unit 507 is capable of deriving a distance to a measurement point that is included in a range that is not captured in one pair of stereo-pair images.

The stereo pair image capturing unit 507 may output a command to an operator of the shovel, so that desired stereo-pair images can be captured. For example, the stereo pair image capturing unit 507 may inform an operator of the shovel of details of the operation required to capture the desired stereo pair images by outputting a control command to at least one of the audio output device D2 and the display device D3. Specifically, a voice message may be output, such as "please turn to the right."

The topography data generator 508 is a functional element for generating topography data. The topography data is, for example, a set of three-dimensional coordinates representing points on a ground surface in the vicinity of the shove. The three-dimensional coordinates are, for example, coordinates in a camera coordinate system. The camera coordinate system is a coordinate system with the camera as a reference. For example, the camera coordinate system is a three-dimensional orthogonal XYZ coordinate system obtained by taking a center point of the camera S6 as the origin; taking a middle line between two optical axis as the X-axis; and taking the Z-axis to be orthogonal to a plane including these two optical axes.

In the embodiment, the topography data generator 508 derives three dimensional coordinates of each measurement points in the camera coordinate system, based on the distance to the measurement point derived by the stereo pair image capturing unit 507.

The coordinate converter 509 is a functional element for converting coordinates in the camera coordinate system into coordinates in another coordinate system. For example, the coordinate converter 509 converts coordinates in the camera coordinate system into coordinates in a shovel coordinate system or a reference coordinate system. The shovel coordinate system is a coordinate system with the shovel as a reference. For example, the shovel coordinate system is a three-dimensional XYZ coordinate system obtained by taking an intersection between the turning axis of the upper turning body 3 and a ground plane of the lower traveling body 1 as the origin; taking a front-rear axis of the lower traveling body 1 as the X-axis; taking a left-right axis of the lower traveling body 1 as the Y-axis; and taking the turning axis as the Z-axis. The reference coordinate system includes, for example, the World Geodetic System. The World Geodetic System is a three-dimensional XYZ coordinate system such that the origin is placed at the centroid of the earth, the X-axis is taken in the direction of the intersection between the Greenwich meridian and the equator, the Y-axis is taken in the direction of 90 degrees east longitude, and the Z-axis is taken in the direction toward the the north pole.

In the embodiment, the coordinate converter 509 converts three-dimensional coordinates of each measurement point in the camera coordinate system derived by the topography data generator 508 into coordinates in the World Geodetic System. However, if topography data is to be generated without moving the shovel, the coordinate converter 509 may convert the three-dimensional coordinates of each measurement point in the camera coordinate system derived by the topography data generator 508 into coordinates in the shovel coordinate system.

The coordinate correction unit 510 is a functional unit for correcting the converted coordinates derived by the coordinate converter 509. In the embodiment, when two or more coordinates that have the common X-axis coordinates and the common Y-axis coordinates, while having different Z-axis coordinates (heights), correspond to a single measurement point, the coordinate correction unit 510 derives one representative Z-axis coordinate (height) from the two or more Z-axis coordinates (heights). For example, the coordinate correction unit 510 derives an average value of the two or more Z-axis coordinates (heights) as the representative Z-axis coordinate (height). The coordinate correction unit 510 can derive the height of the measurement point with higher precision as the number of the Z-axis coordinates (heights) used for deriving the representative Z-axis coordinate (height) increases.

The topography data display 511 is a functional element for displaying topography data generated by the machine guidance device 50. In the embodiment, the topography data display 511 generates a three-dimensional image (e.g., a wire frame, polygon mesh) of a landform in the vicinity of the shovel based on the topography data, and displays the generated three-dimensional image on the display device D3. The topography data is, for example, a set of converted coordinates derived by the coordinate converter 509, or a set of corrected coordinates corrected by the coordinate correction unit 510. The topography data display 511 may generate a three-dimensional image of a designed landform based on the design data, and may display, on the display device D3, the three-dimensional image of the designed landform together with a three-dimensional image of the landform in the vicinity of the shovel. The topography data display 511 may display images actually captured by the camera S6 while combining the images actually captured by the camera S6 with the three-dimensional image of the landform in the vicinity of the shovel. The operator of the shovel can visually recognize the generated topography data and confirm whether there is a point that is not measured yet. Then, if there is a point that is not measured yet, a landform of the point that is not measured yet can be optionally measured.

Figure 7:
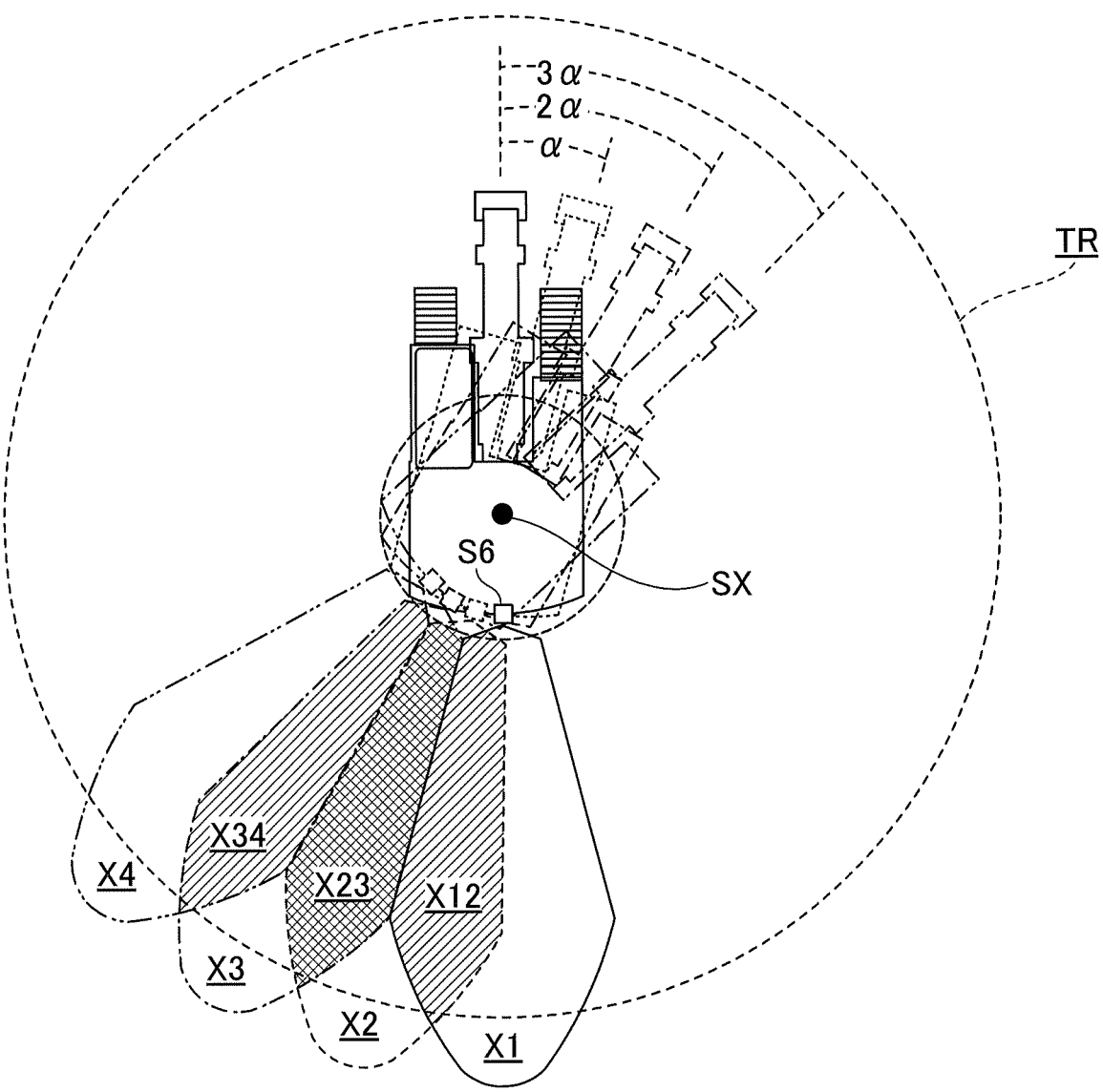
FIG. 7 is a top view of the shovel illustrating a range to be measured by the camera when an upper turning body turns in a right direction.

Next, by referring to FIG. 7, an example of a procedure for generating the topography data is described. FIG. 7 is a top view of the shovel illustrating ranges X1 through X4 to be measured by the camera S6 when the upper turning body 3 turns in the right direction. Specifically, the measurement target range X1 is a measurement target range included in a pair of camera images captured by the camera S6 when the shovel is directed to a reference direction as depicted by the solid line in FIG. 7. The measurement target range X2 is a measurement target range included in a pair of camera images captured by the camera S6 when the upper turning body 3 turns by a turning angle α around the turning axis SX as depicted by the dashed line in FIG. 7. The measurement target range X3 is a measurement target range included in a pair of camera images captured by the camera S6 when the upper turning body 3 further turns by a turning angle α around the turning axis SX as depicted by the one dot chain line in FIG. 7. The measurement target range X4 is a measurement target range included in a pair of camera images captured by the camera S6 when the upper turning body 3 further turns by a turning angle α around the turning axis SX as depicted by the two-dot chain line in FIG. 7.

The overlapping image capturing range X12 indicates a range in which the measurement target range X1 and the measurement target range X2 are overlapping. The overlapping image capturing range X23 indicates a range in which the measurement target range X2 and the measurement target range X3 are overlapping; and the overlapping image capturing range X34 indicates a range in which the measurement target range X3 and the measurement target range X4 are overlapping.

Each time the upper turning body 3 rotates by the turning angle α, the stereo pair image capturing unit 507 captures the stereo-pair images and derives a distance to each measurement point included in the measurement target range included in each pair of the stereo-pair images. Then, the topography data generator 508 derives three-dimensional coordinates of each measurement point in the camera coordinate system based on the distance to the measurement point derived by the stereo pair image capturing unit 507. Then, the coordinate converter 509 converts three-dimensional coordinates of each measurement point in the camera coordinate system derived by the topography data generator 508 into coordinates in the World Geodetic System.

As a result, when an operator causes the upper turning body 3 to turn by 360 degrees, the machine guidance device 50 can capture two Z-axis coordinates (heights) for each measurement point included in an annular region TR in the vicinity of the shovel.

When two Z-axis coordinates (heights) for each measurement point are captured, the coordinate correction unit 510 derives an average value of the two Z-axis coordinates (heights) as a representative Z-axis coordinate (height).

The stereo pair image capturing unit 507 may capture stereo-pair images each time the upper turning body 3 turns by a turning angle $2\alpha$ (twice the turning angle $\alpha$). In this case, the machine guidance device 50 captures one Z-axis coordinate (height) for each measurement point included in the annular region TR in the vicinity of the shovel, and uses the one Z-axis coordinate (height) as the representative Z-axis coordinate (height), as it is. As described above, the machine guidance device 50 can generate the topography data of the annular region TR.

Figure 8:
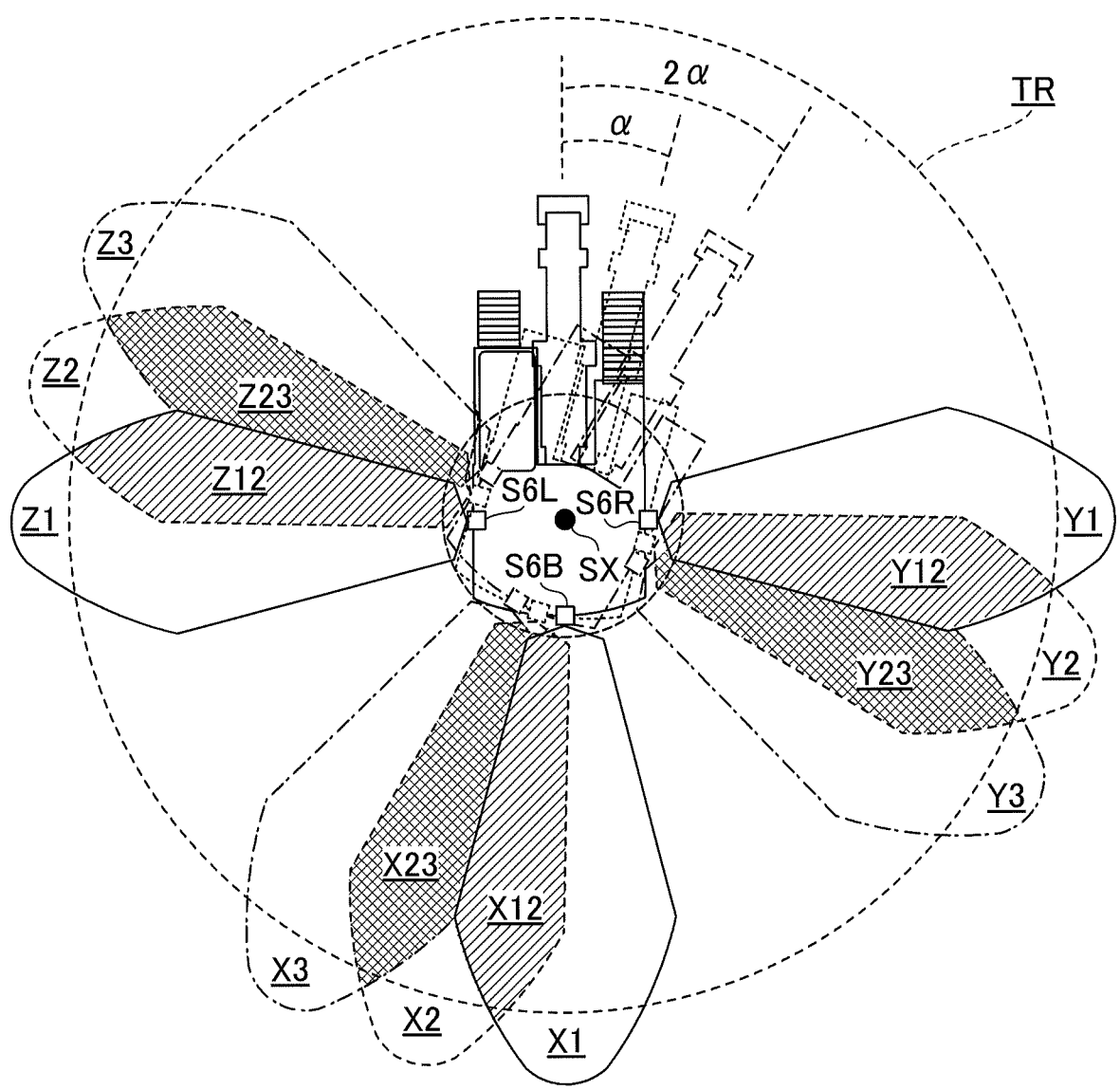
FIG. 8 is a top view of the shovel illustrating a range to be measured by three cameras when the upper turning body turns in the right direction.

Next, by referring to FIG. 8, another example of a procedure for generating the topography data is described. FIG. 8 is a top view of the shovel illustrating ranges to be measured by three cameras S6 (a rear camera S6B, a right side camera S6R, and a left side camera S6L) when the upper turning body 3 turns in the right direction. Specifically, the measurement target ranges X1, Y1, and Z1 are measurement target ranges included in pairs of camera images captured by the rear camera S6B, the right side camera S6R, and the left side camera S6R, respectively, when the shovel is directed in the reference direction as illustrated by the solid line in FIG. 8. The same applies to the measurement target ranges X2, Y2, Z2, X3, Y3, and Z3.

Further, the overlapping image capturing range X12 indicates the range in which the measurement target range X1 and the measurement target range X2 are overlapping. The same applies to the overlapping image capturing ranges Y12, Z12, X23, Y23, and Z23.

Each time the upper turning body 3 turns by a turning angle $\alpha$, the stereo pair image capturing unit 507 captures three pairs of stereo-pair images and derives a distance to each measurement point in the measurement target range included in each pair of stereo-pair images. Then, the topography data generator 508 derives three-dimensional coordinates of each measurement point in the camera coordinate system based on the distance to the measurement point derived by the stereo pair image capturing unit 507. Then, the coordinate converter 509 converts three-dimensional coordinates of each measurement point in the camera coordinate system derived by the topography data generator 508 into coordinates in the World Geodetic System.

As a result, when an operator causes the upper turning body 3 to turn by 180 degrees, the machine guidance device 50 can capture two or four Z-axis coordinates (heights) for each measurement point included in the annular region TR in the vicinity of the shovel. Specifically, the measurement points included in the annular region TR are formed of measurement points, each of the measurement points having two Z-axis coordinates (heights) derived from two pairs of stereo-pair images captured by the left side camera S6L; measurement points, each of the measurement points having two Z-axis coordinates (heights) derived from two pairs of stereo-pair images captured by the right side camera S6R; and measurement points, each of the measurement points having four Z-axis coordinates (heights) derived from two pairs of stereo-pair images captured by the left side camera S6L or the right side camera S6R and two pairs of stereo-pair images captured by the rear camera S6B. A front camera may be additionally attached to the shovel. In this case, when an operator causes the upper turning body 3 to turn by 90 degrees, the machine guidance device 50 can obtain two Z-axis coordinates (heights) for each measurement point included in the annular region TR in the vicinity of the shovel.

When, for each measurement point, at least two Z-axis coordinates (heights) are obtained, the coordinate correction unit 510 derives an average value of the at least two Z-axis coordinates (heights) as the representative Z-axis coordinate (height).

The stereo pair image capturing unit 507 may capture stereo-pair images each time the upper turning body 3 turns by a turning angle $2\alpha$ (twice as the turning angle $\alpha$). In this case, the machine guidance device 50 obtains one or two Z-axis coordinates (heights) for each measurement point included in the annular region TR in the vicinity of the shovel. When a number of the Z-axis coordinates (heights) is one, the one Z-axis coordinate (height) is used as a representative Z-axis coordinate (height) as it is; and when a number of the Z-axis coordinates (heights) is two, the average value of the two Z-axis coordinates (heights) is used as the representative Z-axis coordinate (height). As described above, the machine guidance device 50 can generate the topography data of the annular region TR.

Figure 9A:
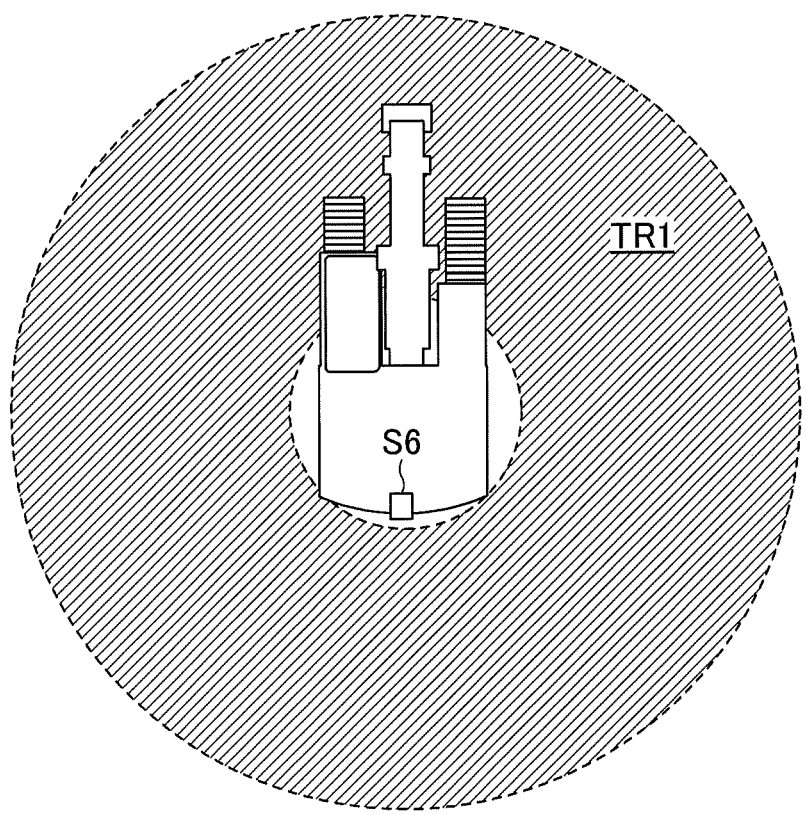
FIG. 9A is a top view of the shovel illustrating an annular region representing a range of topographic data to be generated.
Figure 9B:
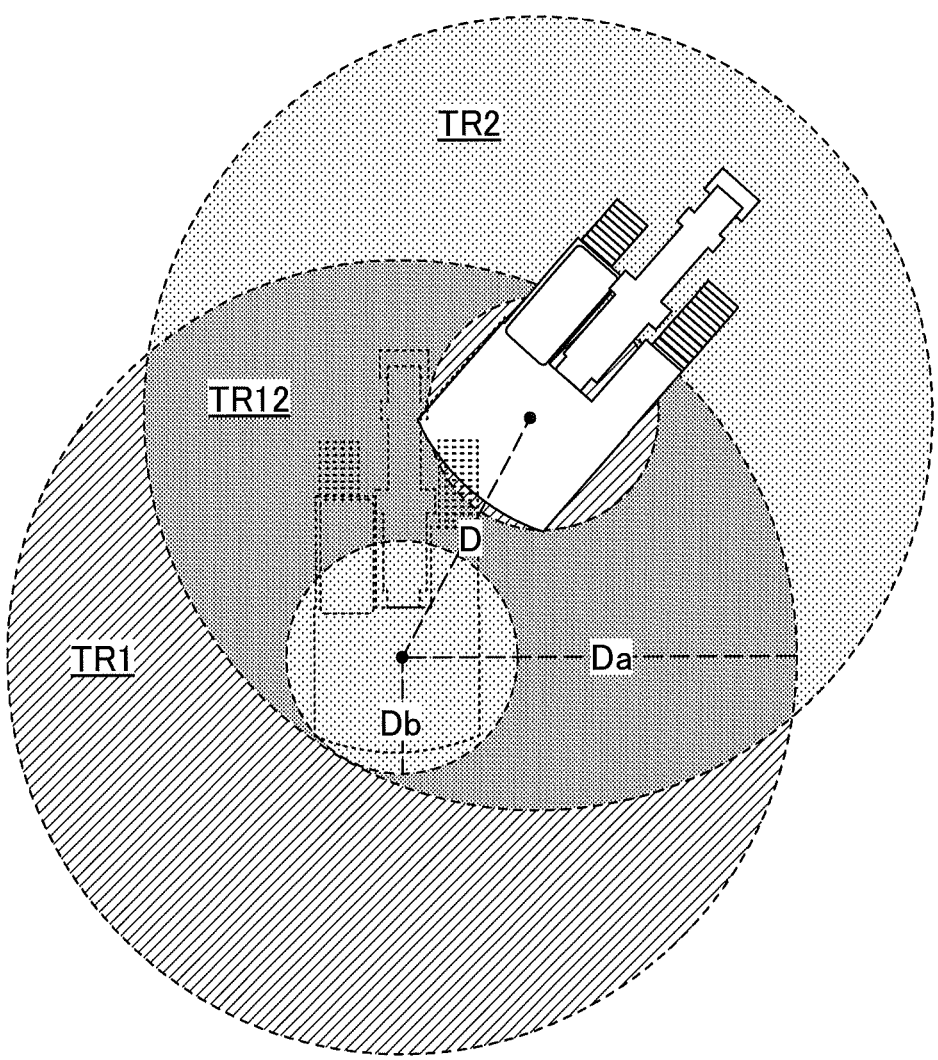
FIG. 9B is a top view of the shovel illustrating annular regions representing a range of topographic data to be generated.
Figure 10:
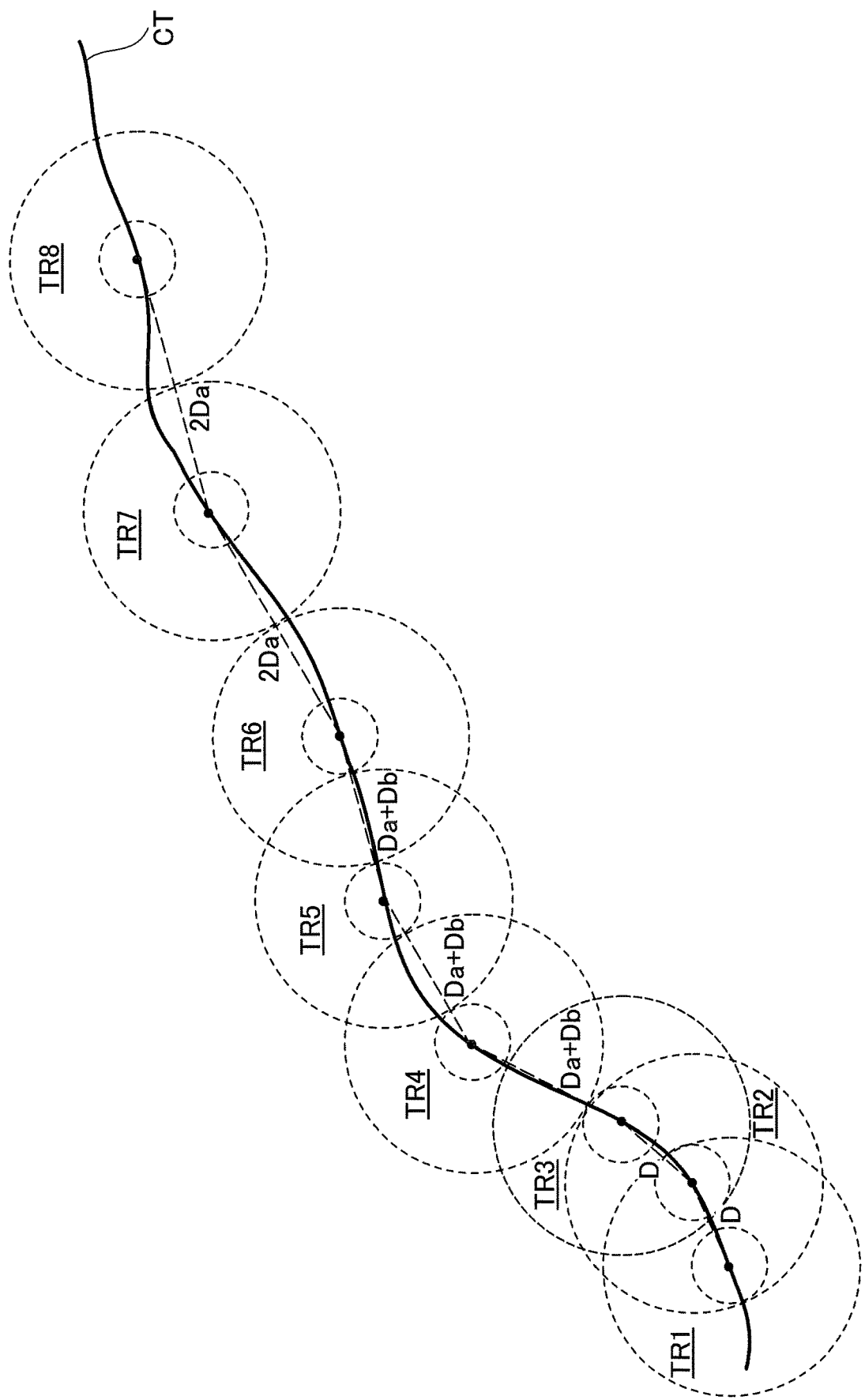
FIG. 10 is a diagram illustrating positional relation between a moving path of the shovel and annular regions.

Next, by referring to FIG. 9A, FIG. 9B, and FIG. 10, a situation is described in which the machine guidance device 50 installed in the shovel, which repeats turning and traveling, generates topography data. FIG. 9A and FIG. 9B are top views of the shovel, in which the camera S6 is installed at an upper rear end of the upper turning body 3. Specifically, FIG. 9A depicts an annular region TR1 (the region indicated by shaded hatching) representing a range of topography data generated when the shovel is turned by 360 degrees while traveling of the shovel is stopped. FIG. 9B depicts, in addition to the annular region TR1 of FIG. 9A, an annular region TR2 representing a range of topography data generated when the shovel is turned by 360 degrees after the shovel travels a predetermined distance D. The region TR12 indicated by fine dot hatching depicts a region in which the annular region TR1 and the annular region TR2 are overlapping. The predetermined distance D is the length obtained by subtracting the inner diameter Db from the outer diameter Da of the annular regions TR1 and TR2. This implies that, when the shovel travels by the predetermined distance D, an inner circle of the annular region TR1 contacts an outer circle of the annular region TR2, and an inner circle of the annular region TR2 contacts an outer circle of the annular region TR1. The region indicated by coarse dot hatching in FIG. 9B represents a range of topography data generated for the first time by turning the shovel by 360 degrees after the shovel travels by the predetermined distance D. Specifically, it is the region inside the inner circle of the annular region TR1 and the region outside the outer circle the annular region TR1 and inside the outer circle of the annular region TR2.

Next, by referring to FIG. 10, the timing is described that is for the traveling shovel to turn 360 degrees to generate topography data, and a range of the topography data (an annular region) is described that is generated by turning by 360 degrees. FIG. 10 illustrates positional relation between a moving path CT of the shovel and annular regions TR1 through TR8. Additionally, FIG. 10 illustrates that the shovel travels from left to right along the moving path CT, and that topography data is generated in the order of the annular region TR1, the annular region TR2, and so forth.

In FIG. 10, up to the annular region TR3, a range of topography data is depicted that is generated by turning by 360 degrees each time the shovel travels the distance D. From the annular region TR4 to the annular region TR6, a range of topography data is depicted that is generated by turning by 360 degrees each time the shovel travels the distance (Da+Db). On and after the annular region TR7, a range of topography data is depicted that is generated by turning by 360 degrees each time the shovel travels the distance 2 Da (twice the outer diameter Da of the annular region).

As described above, the machine guidance device 50 can generate topography data while automatically capturing stereo-pair images at appropriate timings on the shovel that repeats turning and traveling.

The machine guidance device 50 may inform an operator of the shovel of details of an operation required for generating topography data of a desired range, and may generate the topography data of the desired range while avoiding overlap as much as possible, or while making as much overlap as possible. Here, "overlap" implies that two or more different Z-axis coordinates (heights) are obtained for a single measurement point. Then, avoiding overlap causes an effect such that the topography data can be efficiently generated; and making overlap causes an effect such that the accuracy of the topography data can be enhanced. However, as a work progresses, a landform of a work site changes depending on time. For this reason, the machine guidance device 50 may measure a landform in the vicinity of the shovel at predetermined time intervals, and may update topography data with the measurement result to obtain updated topography data. Additionally, by comparing the previous topography data with the updated topography data, an amount of sediment that was the target of working may be calculated. The amount of the sediment that was the target of working may be, for example, an amount of the sediment excavated by an excavation work, an amount of the sediment backfilled in a backfill operation, and so forth.

By the above-described configuration, the machine guidance device 50 that functions as a measurement device of the shovel measures a landform in the vicinity of the shovel based on stereo-pair images captured by a camera that is capable of stereo photographing during turning of the shovel. Accordingly, topography data in the vicinity of the shovel (e.g., surrounding 360 degrees) can be generated. As a result, progress of construction can be efficiently managed.

The machine guidance device 50 measures a landform in the vicinity of the shovel based on a plurality of pairs of stereo-pair images captured at various turning angles. As a result, a blind spot region (the region for which topography data cannot be generated) formed by an object located in the vicinity of the shovel can be reduced.

By using the stereo-pair images captured by each of the three cameras, which are the rear camera S6B, the right side camera S6R, and the left side camera S6L, topography data in the vicinity of the shovel can be generated more efficiently and/or more precisely.

The machine guidance device 50 can facilitate an operation of the shovel by an operator using the topography data generated as described above, or can execute automatic control of the shovel. As a result, construction can be progressed smoothly.

As the machine guidance device 50 measures a landform in the vicinity of the shovel based on stereo-pair images, the machine guidance device 50 can generate topography data more precisely compared to a configuration in which the topography data is derived from a track of the edge of the bucket. The reason is that a change in the ground surface can be detected, which is caused, for example, by sediment spilled from the bucket 6, sediment collapsed into a hollow, backfilled sediment, etc.

The machine guidance device 50 measures a landform in the vicinity of the shovel based on stereo-pair images captured by the camera attached to the upper turning body 3. As a result, it is not necessary to install the camera outside the shovel, and the camera does not interfere with work.

The machine guidance device 50 may determine position coordinates of the measurement point based on first position coordinates of the measurement point derived from first stereo-pair images and second position coordinates of the measurement point derived from the second stereo-pair images captured with a condition that is different from that of the first stereo-pair images. The machine guidance device 50 may determine position coordinates of the measurement point based on first position coordinates of the measurement point derived from stereo-pair images captured by a first camera and second position coordinates of the measurement point derived from the stereo-pair images captured by a second camera. As described above, the machine guidance device 50 may determine position coordinates to be finally used from a plurality of sets of position coordinates with respect to a single measurement point. For example, an average value of a plurality of height coordinates may be used as a final height coordinate.

The preferred embodiment of the present disclosure is described in detail above. However, the present disclosure is not limited to the above-described embodiment. Various modifications and substitutions may be added to the above-described embodiment without departing from the scope of the present disclosure.

For example, in the above-described embodiment, the functional unit for measuring a landform in the vicinity of the shovel is implemented as a part of the machine guidance device 50; however, the functional unit for measuring the landform in the vicinity of the shovel may be embedded in the controller 30 attached to the main body of the shovel. Alternatively, it may be embedded in a management device installed outside the shovel, or a mobile terminal, such as a smart phone.

Figure 11:
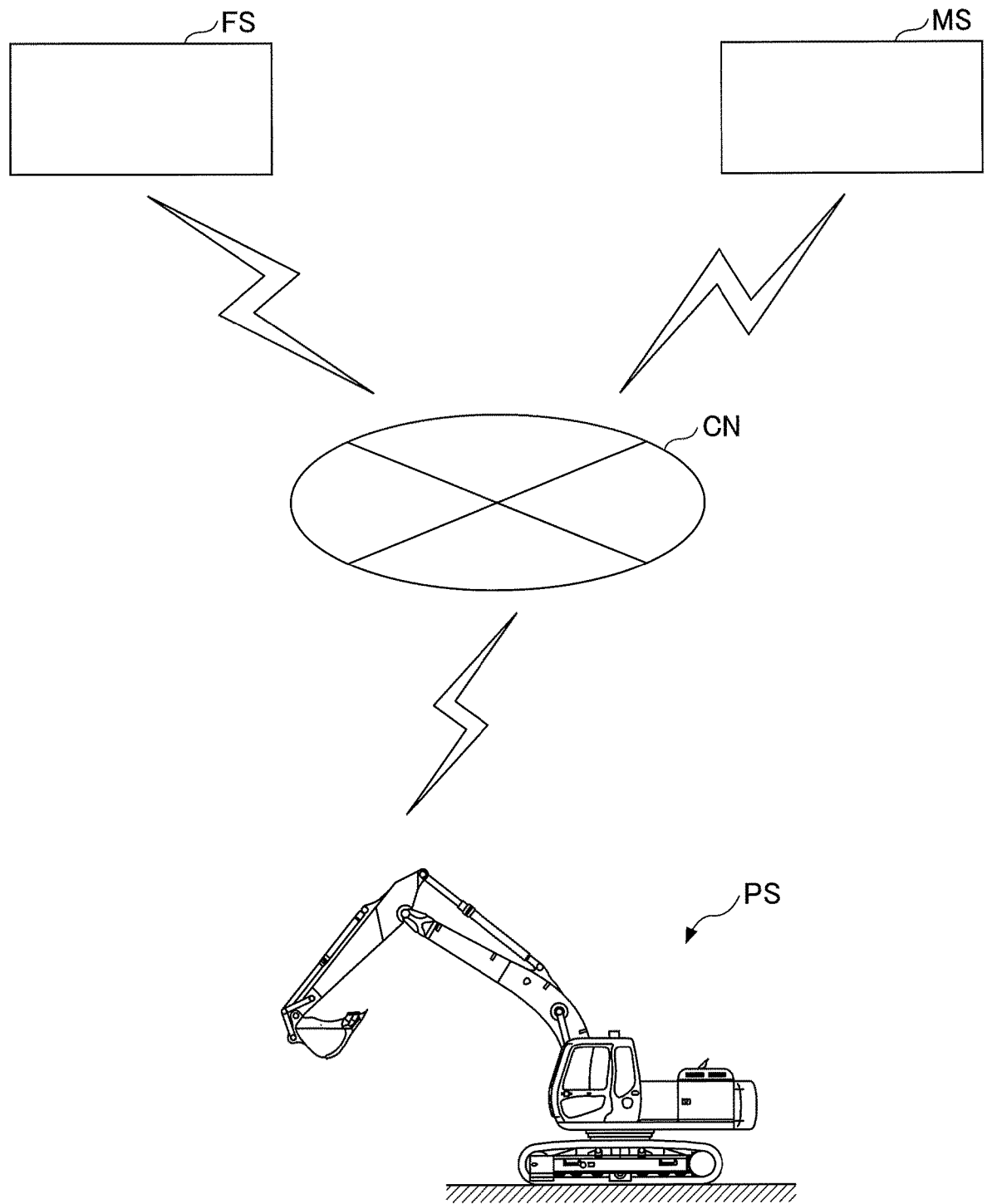
FIG. 11 is a diagram illustrating an example of a measurement system for measuring a landform in a vicinity of the shovel.

FIG. 11 is a diagram illustrating an example of a measurement system as a measurement device such that a functional unit for measuring a landform in the vicinity of the shovel is embedded in at least one of the management device and the mobile terminal. As illustrated in FIG. 11, the measurement system includes a shovel PS; a management device FS; and a mobile terminal MS (assisting device). The shovel PS, the management device FS, and the mobile terminal MS function as communication terminals connected to each other through a communication network CN. Each of the shovel PS, the management device FS, and the mobile terminal MS forming the measurement system may be a single unit or a plurality of units. In the example of FIG. 11, the measurement system includes one unit of the shovel PS, one unit of the management device FS, and one unit of the mobile terminal MS.

The shovel includes a communication device S7. The communication device S7 transmits information toward outside the shovel PS. The communication device S7 transmits, for example, information that can be received by at least one of the management device FS and the mobile terminal MS.

The management device FS is a device for managing work of the shovel PS. For example, the management device FS is a computer provided with a display device, which is installed in a management center, etc., outside the work site. The management device FS may be a portable computer that can be carried by a user. The mobile terminal MS is a communication terminal provided with a display device, such as a smartphone, a tablet terminal, and a laptop personal computer.

When stereo-pair images are captured in the shovel PS, the communication device S7 of the shovel PS transmits information to the management device FS and the mobile terminal MS through a communication network CN. This information includes information required for measuring a landform in the vicinity of the shovel. The management device FS and the mobile terminal MS generate a three-dimensional image of a landform in the vicinity of the shovel (e.g., a wire frame, polygon mesh), and display the three-dimensional image on the attached display device (display unit). Accordingly, an administrator, etc., of the shovel PS can confirm a landform in the vicinity of the shovel using at least one of the administration device FS and the mobile terminal MS. As a result, a change in the ground surface can be detected, which is caused by sediment spilled from the bucket 6, sediment collapsed into a hollow, backfilled sediment, etc.; and progress of construction can be efficiently managed.

Alternatively, the shovel PS or the management device FS may generate a three-dimensional image of a landform in the vicinity of the shovel, transmit data of the generated three-dimensional image to the mobile terminal MS, and cause the display device (display unit) of the mobile terminal MS to display the three-dimensional image.

In the above-described embodiment, the machine guidance device 50 measures a landform in the vicinity of the shovel based on stereo-pair images captured by the camera S6 during turning of the shovel. However, the present disclosure is not limited to this configuration. For example, the machine guidance device 50 may measure a landform in the vicinity of the shovel based on stereo-pair images captured by the camera S6 during traveling of the shovel, or may measure a landform in the vicinity of the shovel based on stereo-pair images captured by the camera S6 during traveling and turning of the shovel.

The invention claimed is:

1. A measurement device of a shovel, wherein the measurement device is installed in the shovel comprising:
 a lower travelling body that performs traveling operation;
 an upper turning body pivotably mounted on the lower traveling body;
 a boom that is attached to the upper turning body, the boom being included in an attachment; and
 an arm that is attached to the boom, the arm being included in the attachment,
 wherein the measurement device measures a landform in a vicinity of the shovel at a plurality of positions of the shovel based on an output of a device that captures information on a distance to a surrounding measurement target, the device being located above the lower traveling body,
 wherein, when the measurement device is unable to capture a landform included in a blind spot region at one position of the device among a plurality of positions of the device, the measurement device captures the landform included in the blind spot region at a position of the device other than the one position of the device.

2. The measurement device of the shovel according to claim 1, wherein, for a region for which the device is unable to capture information on a distance at a first position among the plurality of positions, the device captures the information on the distance for the region at a second position that differs from the first position.

3. The measurement device of the shovel according to claim 2, wherein the first position and the second position are positions of the device during turning or travelling of the shovel.

4. The measurement device of the shovel according to claim 1, wherein a plurality of the devices is attached to respective different positions of the shovel.

5. The measurement device of the shovel according to claim 1, wherein a plurality of the devices is attached to a respective plurality of the shovels, and the plurality of devices capture information on distances to a respective plurality of surrounding measurement targets at the plurality of positions.

6. The measurement device of the shovel according to claim 5, wherein the information on the distances to, the respective plurality of surrounding measurement targets captured by the plurality of devices attached to the respective plurality of shovels is transmitted to a management device.

7. The measurement device of the shovel according to claim 1, wherein the measurement device outputs a command to an operator of the shovel based on the captured information on the distance to the surrounding measurement target.

8. The measurement device of the shovel according to claim 1, wherein the measurement device generates a point that is not measured yet based on the captured information on the distance to the surrounding measurement target.

9. A shovel comprising:
 a lower travelling body that performs traveling operation;
 an upper turning body pivotably mounted on the lower traveling body;
 a boom that is attached to the upper turning body, the boom being included in an attachment;
 an arm that is attached to the boom, the arm being included in the attachment; and
 a device that is located above the lower traveling body and that captures information on a distance to a surrounding measurement target at a plurality of positions of the shovel,
 wherein the shovel measures a landform in a vicinity of the shovel based on an output of the device, and
 wherein, when the shovel is unable to capture a landform included in a blind spot region at one position of the shovel among the plurality of positions of the shovel, the shovel captures the landform included in the blind spot region at a position of the shovel other than the one position of the shovel.

10. The shovel according to claim 9, wherein, for a region for which the device is unable to capture information on a distance at a first position among the plurality of positions, the device captures the information on the distance for the region at a second position that differs from the first position.

11. The shovel according to claim 10, wherein the first position and the second position are positions of the device during turning or travelling of the shovel.

12. The shovel according to claim 9, wherein a plurality of the devices is attached to respective different positions of the shovel.

13. The shovel according to claim 9, wherein a plurality of the devices is attached to a respective plurality of the shovels, and the plurality of devices capture information on distances to a respective plurality of surrounding measurement targets at the plurality of positions.

14. The shovel according to claim 13, wherein the information on the distances to the respective plurality of surrounding measurement targets captured by the plurality of devices attached to the respective plurality of shovels is transmitted to a management device.

15. The shovel according to claim 9, wherein the shovel outputs a command to an operator of the shovel based on the captured information on the distance to the surrounding measurement target.

16. The shovel according to claim 9, wherein the shovel generates a point that is not measured yet based on the captured information on the distance to the surrounding measurement target.

17. A management device of a shovel that measures a landform in a vicinity of the shovel based on first distance information captured by a first device that captures information on a distance to a measurement target and second distance information captured by a second device that captures information on a distance to a measurement target, wherein the first device is located above a lower travelling body of a first shovel and the second device is located above a lower travelling body of a second shovel, and the first device and the second device capture information on distances to a respective plurality of surrounding measurement targets at a plurality of positions; wherein, for a region for which at least one of the first device and the second device is unable to capture information on a distance at a first position among the plurality of positions, the at least one of the first device and the second device captures the information on the distance for the region at a second position that differs from the first position.

18. The management device of the shovel according to claim 17, wherein the first position and the second position are positions of the at least one of the first device and the second device during turning or travelling of the shovel.

19. The measurement device of the shovel according to claim 17, wherein at least a plurality of the first devices or a plurality of the second devices is attached to respective different positions of the shovel.

* * * * *